US011836287B1

(12) United States Patent
Tal

(10) Patent No.: US 11,836,287 B1
(45) Date of Patent: Dec. 5, 2023

(54) LIGHT PATTERN-BASED ALIGNMENT FOR RETINAL EYE TRACKING

(71) Applicant: Apple Inc., Cupertino, CA (US)

(72) Inventor: Eran Tal, Petach Tivka (IL)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 17/480,367

(22) Filed: Sep. 21, 2021

Related U.S. Application Data

(60) Provisional application No. 63/081,549, filed on Sep. 22, 2020.

(51) Int. Cl.
*G06F 3/01* (2006.01)
*G06T 7/80* (2017.01)
*G06V 40/19* (2022.01)

(52) U.S. Cl.
CPC ............... *G06F 3/013* (2013.01); *G06T 7/80* (2017.01); *G06V 40/19* (2022.01); *G06T 2207/10048* (2013.01)

(58) Field of Classification Search
CPC ............ G02B 26/0833; G02B 27/0075; G02B 27/0172; G02B 27/18; G02B 3/08; G02B 30/24; G02B 30/35; G02B 30/36; G02B 2027/0112; G02B 2027/014; G02B 2027/0178; G02B 27/0081; G02B 27/0093; G02B 27/017; G02B 27/0176; G02B 30/00; G02B 30/40; G02B 2027/0134; G02B 2027/0138; G02B 2027/0174; G02B 2027/0187; H04N 13/32; H04N 13/324; H04N 13/351; H04N 13/344; H04N 13/383; A61B 3/111; A61B 3/113; G06F 1/163; G06F 3/011; G06F 3/012; G06F 3/013; G06F 3/017; G06F 3/0346; G06F 3/04815; G06F 3/16; G06F 3/167; G06T 19/00; G06T 3/40; G06T 7/292; G06T 7/70; G06V 10/42; G06V 10/467; G06V 10/60; G06V 40/193

See application file for complete search history.

(56) References Cited

U.S. PATENT DOCUMENTS

| 10,152,121 | B2 | 12/2018 | Trail | |
|---|---|---|---|---|
| 2019/0171020 | A1 | 6/2019 | Robbins et al. | |
| 2020/0026350 | A1 | 1/2020 | Eash et al. | |
| 2021/0109363 | A1* | 4/2021 | Lyubarsky | ........... H04N 13/324 |
| 2021/0271320 | A1* | 9/2021 | Fiess | ...................... A61B 3/113 |
| 2022/0057862 | A1* | 2/2022 | Miller | ................. G06F 3/04815 |

FOREIGN PATENT DOCUMENTS

| WO | 2015192117 | 12/2015 |
|---|---|---|
| WO | 2020112757 | 6/2020 |

* cited by examiner

*Primary Examiner* — Nelson M Rosario
(74) *Attorney, Agent, or Firm* — Thompson Hine LLP

(57) ABSTRACT

Various implementations disclosed herein include devices, systems, and methods that provide retinal imaging-based gaze tracking. In some implementations, a user's gaze is tracked based on based on a retinal imaging technique that corrects for misalignment between content display components and tracking components. In some implementations, misalignment is detected by providing a light pattern (e.g., IR light sources embedded in a display) within or adjacent to displayed content and assessing the image of the light pattern on the retina.

20 Claims, 7 Drawing Sheets

US 11,836,287 B1

LIGHT PATTERN-BASED ALIGNMENT FOR RETINAL EYE TRACKING

CROSS-REFERENCE TO RELATED APPLICATION

This application claims the benefit of U.S. Provisional Application Ser. No. 63/081,459 filed Sep. 22, 2020, which is incorporated herein in its entirety.

TECHNICAL FIELD

The present disclosure generally relates to providing retinal imaging-based eye tracking of a user of an electronic device and, in particular, to systems, methods, and devices that detect misalignment in retinal imaging-based eye tracking of a user of an electronic device.

BACKGROUND

Retinal imaging-based gaze tracking systems generally have both an illumination source to illuminate the retina and an image sensor to generate images including light reflected from the retina. Retinal imaging-based gaze tracking generally compares a current retinal image from a gaze tracking image sensor to a map of the retina obtained during enrollment. However, misalignments between displayed content at an electronic device and the gaze tracking image sensor may result from thermal drifts, physical shocks, or the like. Misalignments between the display content and the image sensor used for tracking can result in gaze direction errors while performing retinal imaging-based gaze tracking.

SUMMARY

Various implementations disclosed herein include devices, systems, and methods that provide retinal imaging-based gaze tracking by overcoming misalignment between a content device (e.g., a display) and a sensor (e.g., a camera) used for retinal eye tracking. In some implementations, light sources such as point sources (e.g., using a predefined pattern) may be embedded in a display, or mounted on the display, or pass light through the display. In one example, IR light from IR light sources at the display is imaged onto the retina (e.g., using an eyepiece and eye optics components) to produce a pattern that is visible/detectable by the gaze tracking image sensor. For example, the detected pattern of IR light is overlaid on the retinal image. Changes in the relative positioning between the content display and gaze tracking image sensor will result in a relative change between the projected IR pattern and the retinal image as seen by the same gaze tracking image sensor. In some implementations, the retinal image may be generated during device production at a factory by calibrating the illumination pattern with the gaze tracking image sensor (e.g., in an initial alignment during a factory enrollment). In some implementations, subsequent misalignments between the display and the gaze tracking image sensor are detected and/or corrected. Accordingly, retinal imaging-based gaze tracking errors from misalignments may be reduced or eliminated.

In some implementations, a method includes producing a light pattern via a pattern light source, where the pattern light source has a spatial relationship to a content light source that produces displayed content. In some implementations, sensor data is received at a sensor, where the sensor data includes data corresponding to at least a portion of the light pattern detected using retinal imaging. In some implementations, an alignment characteristic is determined between the content light source and the sensor, where the alignment characteristic based on the spatial relationship and the sensor data, and an eye characteristic is determined based on the sensor data and the alignment characteristic.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
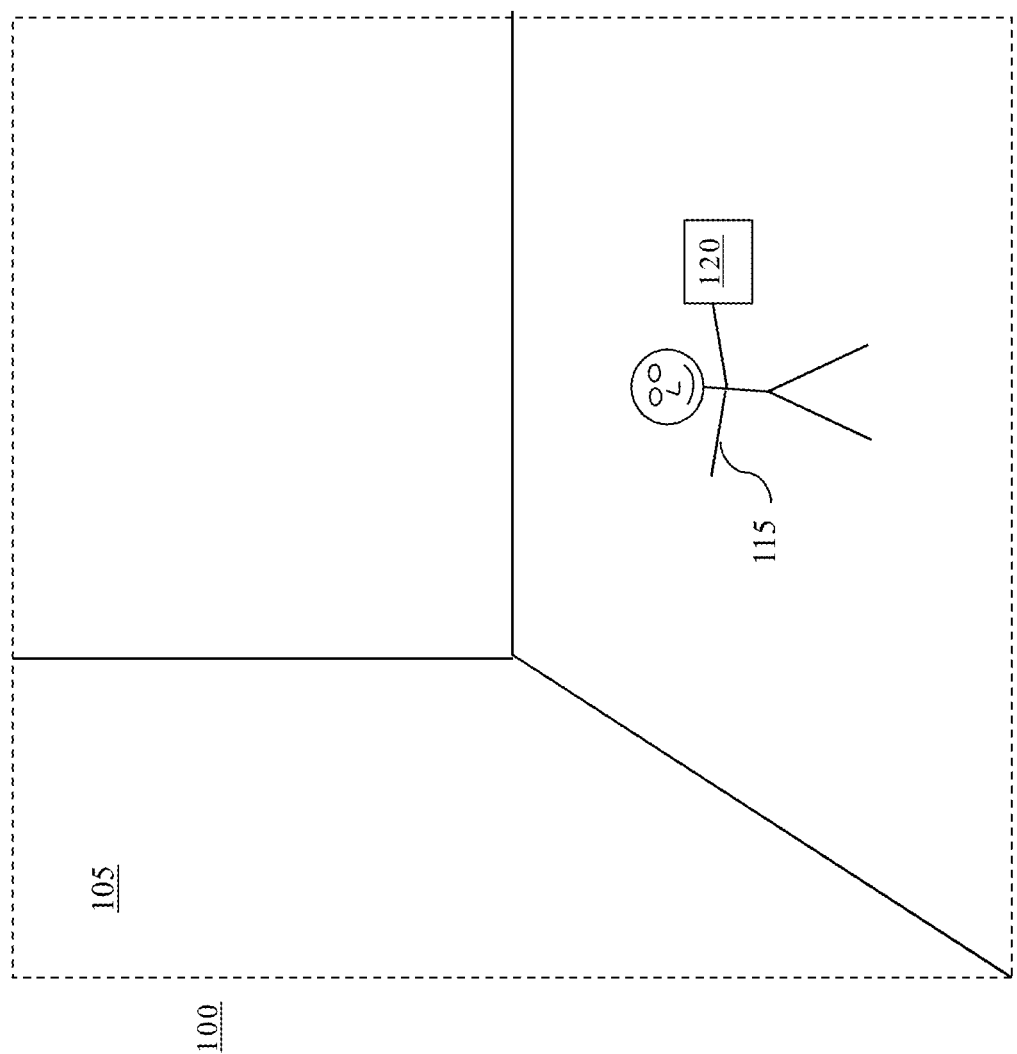
FIG. 1 illustrates an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example operating environment 100 in which electronic device 120 is used in physical environment 105. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell.

In the example of FIG. 1, the device 120 is illustrated as a single device. Some implementations of the device 120 are hand-held. For example, the device 120 may be a mobile phone, a tablet, a laptop, and so forth. In some implementations, the device 120 is worn by a user. For example, the device 120 may be a watch, a head-mounted device (HMD), and so forth. In some implementations, functions of the device 120 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 120 may communicate with one another via wired or wireless communications.

Various implementations disclosed herein include devices, systems, and methods that implement retinal imaging-based gaze tracking. Various implementations disclosed herein include devices, systems, and methods that utilize a content display system to align a gaze tracking system of an electronic device in accordance with some implementations. For example, misalignment is detected by providing a light pattern (e.g., IR light sources at a display) within or adjacent to displayed content and assessing an image of the retina of the eye including the light pattern obtained using a gaze tracking sensor.

Figure 2:
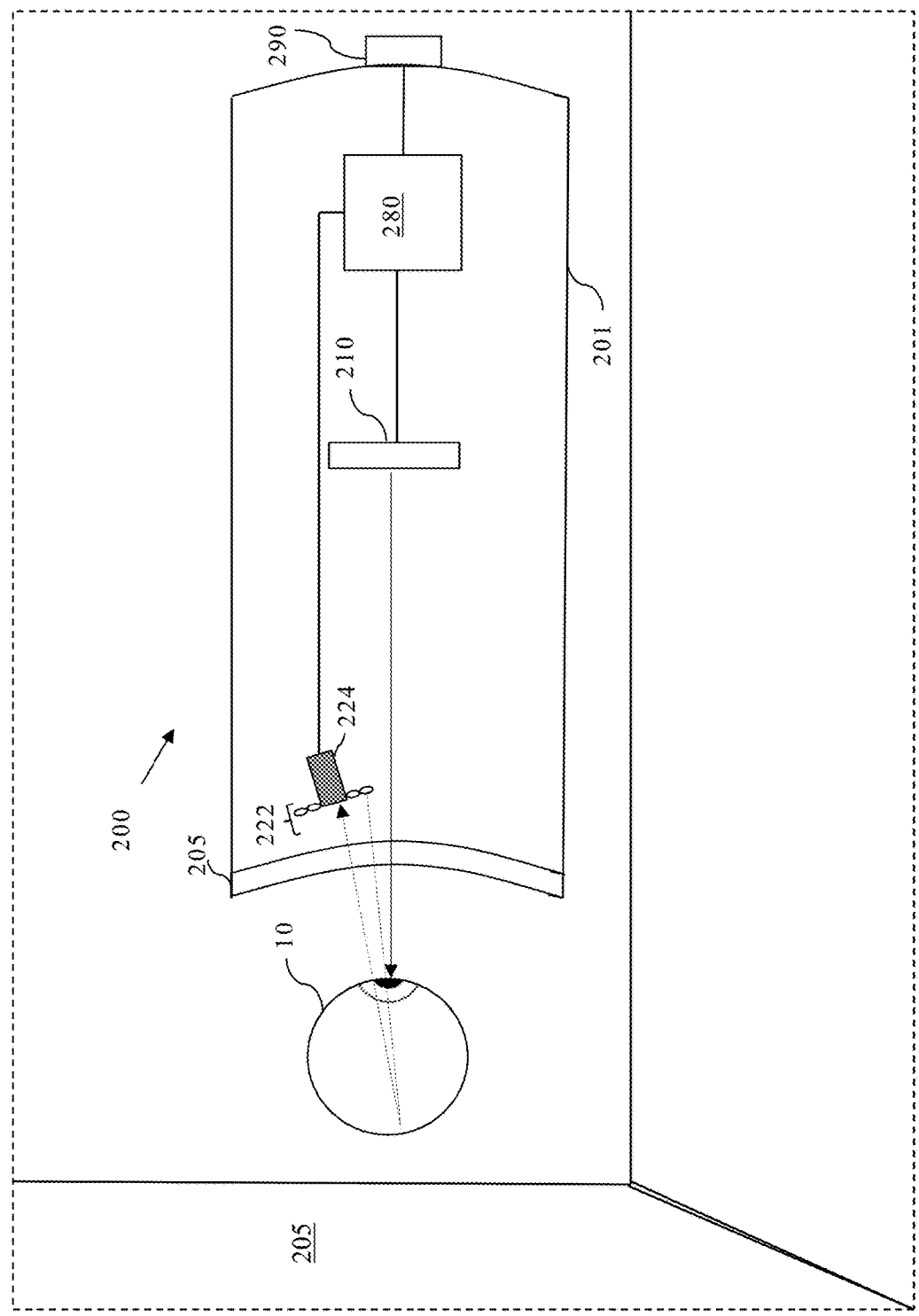
FIG. 2 illustrates an exemplary head mounted device (HMD) in accordance with some implementations.

FIG. 2 illustrates a block diagram of an HMD 200 in accordance with some implementations. The head-mounted device 200 includes a housing 201 (or enclosure) that houses various components of the head-mounted device 200. The housing 201 includes (or is coupled to) an eye pad 205 disposed at a proximal (to the user 10) end of the housing 201. In various implementations, the eye pad 205 is a plastic or rubber piece that comfortably and snugly keeps the head-mounted device 200 in the proper position on the face of the user 10 (e.g., surrounding the eye of the user 10).

The housing 201 houses a display 210 that displays an image, emitting light towards onto the eye of a user 10. In various implementations, the display 210 emits the light through an eyepiece (not shown) that refracts the light emitted by the display 210, making the display appear to the user 10 to be at a virtual distance farther than the actual distance from the eye to the display 210. For the user to be able to focus on the display 210, in various implementations, the virtual distance is at least greater than a minimum focal distance of the eye (e.g., 7 cm). Further, in order to provide a better user experience, in various implementations, the virtual distance is greater than 1 meter.

Although FIG. 2 illustrates a head-mounted device 200 including a display 210 and an eye pad 205, in various implementations, the head-mounted device 200 does not include a display 210 or includes an optical see-through display without including an eye pad 205.

The housing 201 also houses a pupil assessment system including one or more light sources 222, image sensor 224, and a controller 280. The one or more light sources 222 emit light towards the eye of the user 10 that reflects light (e.g., a directional beam) that can be detected by the sensor 224. Based on the reflections, the controller 280 can determine pupil characteristics of the user 10. As another example, the controller 280 can determine a pupil center, a pupil size, gaze direction, or a point of regard. Thus, in various implementations, the light is emitted by the one or more light sources 222, reflects off the eye of the user 10, and is detected by the sensor 224. In various implementations, the light from the eye of the user 10 is reflected off a hot mirror or passed through an eyepiece before reaching the sensor 224.

The display 210 may emit light in a first wavelength range and the one or more light sources 222 may emit light in a second wavelength range. Similarly, the sensor 224 may detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In some implementations, the display 210 includes a light pattern (e.g., IR light sources embedded in the display 210) within or adjacent to displayed content. In some implementations, the IR light pattern at the display 210 is used to align the image sensor 224 of the head-mounted device 200. For example, misalignment of the image sensor 224 is detected by assessing a retinal image that includes the light pattern overlaid on the retina.

In some implementations, the one or more other light sources (not shown) emit light towards the eye of the user which reflects in the form of one or more glints off the surface of the eye.

In various implementations, the sensor 224 is a frame/shutter-based camera that, at a particular point in time or multiple points in time at a frame rate, generates an image of the eye of the user 10. Each image includes a matrix of pixel values corresponding to pixels of the image which correspond to locations of a matrix of light sensors of the camera.

In various implementations, pupil characteristic assessment is used to facilitate gaze tracking, which may be used to enable user interaction (e.g., the user 10 selects an option on the display 210 by looking at it), provide foveated rendering (e.g., present a higher resolution in an area of the display 210 the user 10 is looking at and a lower resolution elsewhere on the display 210), or reduce geometric distortion (e.g., in 3D rendering of objects on the display 210).

Various implementations disclosed herein include devices, systems, and methods that correct misalignment between content display components and tracking components in an electronic device. In some implementations, misalignment is detected by providing a light pattern (e.g., IR light sources at a display) within or adjacent to displayed content and assessing an image of the retina of the eye including the light pattern obtained using a gaze tracking sensor.

Figure 3:
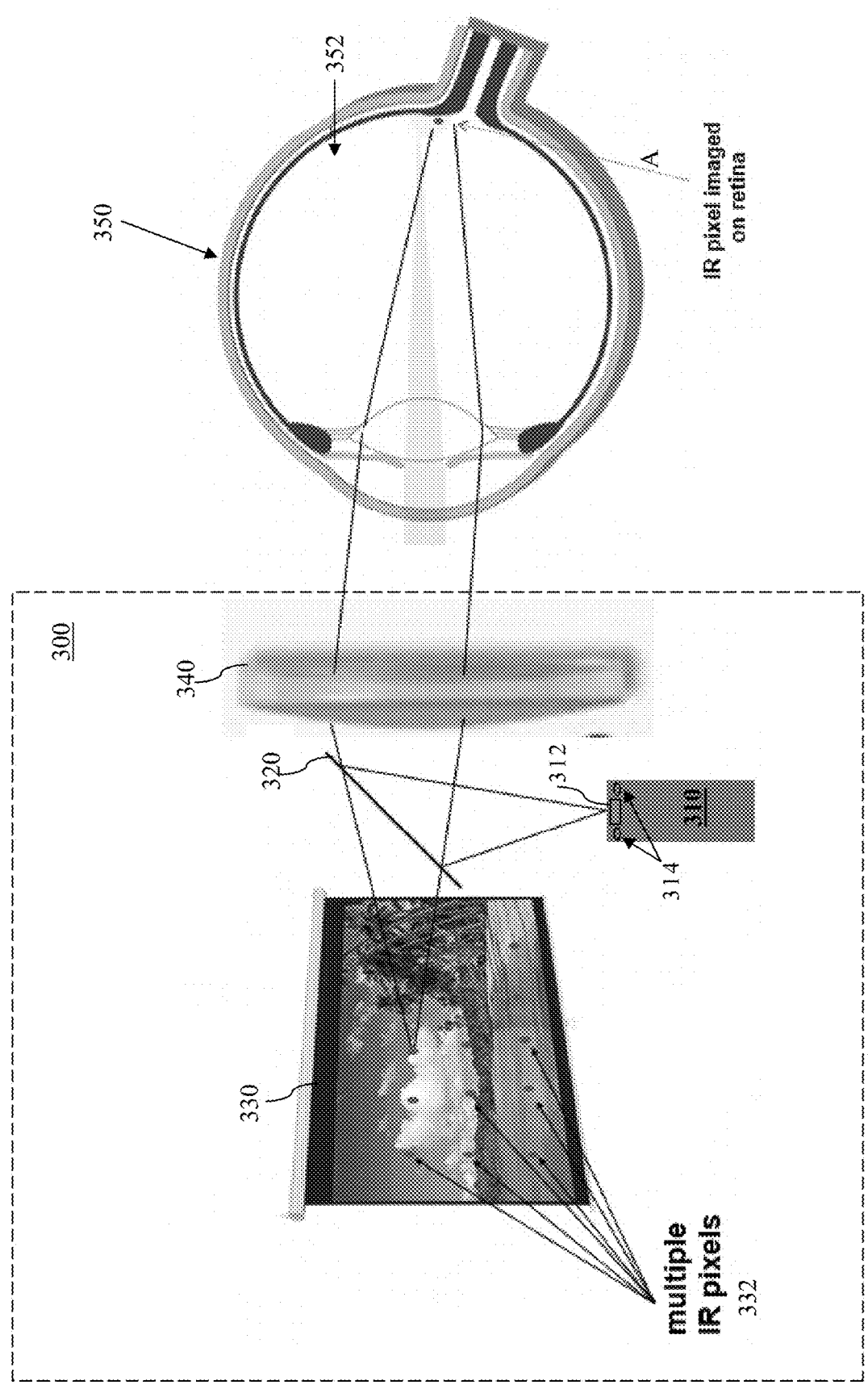
FIG. 3 is a block diagram that illustrates an exemplary content display system used to align a gaze tracking system of an electronic device in accordance with some implementations.

FIG. 3 is a block diagram that illustrates an exemplary content display system used to align a gaze tracking system of an electronic device in accordance with some implementations. In some implementations, misalignment may occur between a display 330 and gaze tracking system 310 of an electronic device 300. For example, misalignment occurs because the electronic device 300 is dropped or thermal effects on the display 330 alters the alignment between the gaze tracking system (e.g., camera) 310 and the display 330. Such misalignment causes the gaze tracking to be incorrect because the gaze is no longer reported correctly.

As shown in FIG. 3, IR pixels 332 are placed in the display 330 and the device 300 focuses the content from the display 330 into the eye 350. In some implementations, light from the content provided at the display 330 passes through a beam splitter 320 and an eye piece 340 and is focused on the retina 352 of the eye 350. In addition, light reflected from the retina 352 is passes through the eye piece 340 and is reflected by the beam splitter 320 into an image sensor 312 of the gaze tracking system 310 to obtain images of the retina 352 to track the gaze or orientation of the eye 350. In some implementations, every one of the IR pixels 332 will become an IR dot on the retina 352, and the gaze tracking system 310 will obtain images with the IR dots overlaid on features (e.g., blood vessels) of the retina 352.

Figure 4:
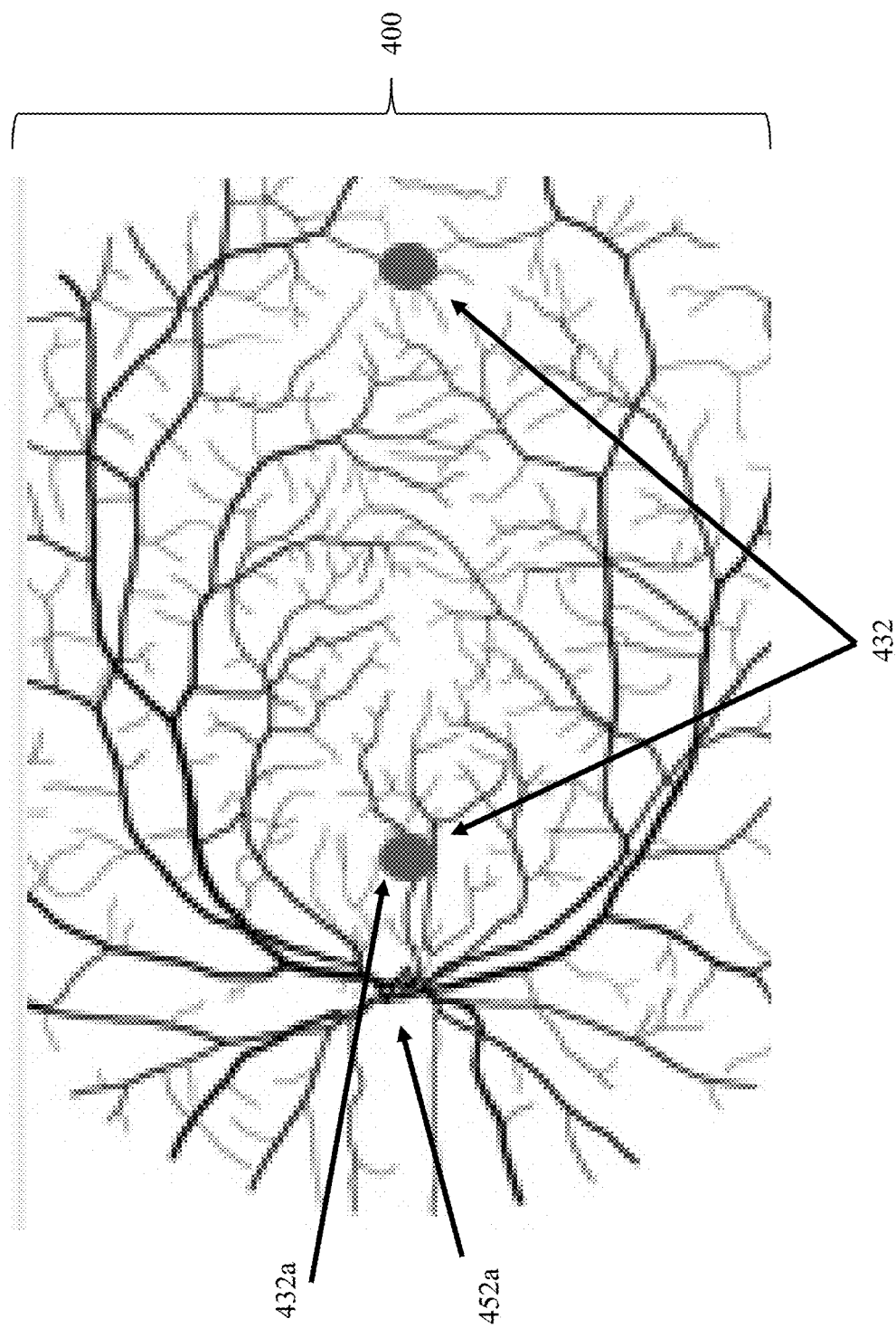
FIG. 4 is a diagram that illustrates an example image including a portion of a pattern of lights in combination with features of a retina in accordance with some implementations.

FIG. 4 is a diagram that illustrates an example image including a portion of a pattern of lights in combination with features of a retina. As shown in FIG. 4, a retinal image 400 includes a portion of an IR light pattern 432 (e.g., IR dots) and features of the retina 352 such as blood vessels. In some implementations, the gaze tracking system 310 obtains images of the retina 352 and IR light pattern of the IR pixels 332 simultaneously, which are used to align or monitor the alignment of the display 330 and the gaze of the user of the electronic device 300.

In some implementations, there is a spatial relationship between the gaze tracking system and the content display system that is detected and that spatial relationship may be used to correct for any misalignment. For example, there is a known or fixed spatial relationship between the gaze tracking image sensor 312 and the content display 330 that is detected and that known spatial relationship may be used to correct for any subsequent misalignment. In some implementations, a first enrollment (e.g., factory alignment) is used to generate a map of the retina of the user of the device 300 that includes the position of the IR light pattern 432. For example, the first enrollment determines the spatial relationship (e.g., distance) between an IR feature 432a and a feature (e.g., cluster or intersection) 452a of the retina 352. As shown in FIG. 4, since they are on the same imaging plane, even when the gaze of the user of the device 300 changes, the IR feature 432a and the feature 452a move together. For example, the number of pixels between the IR feature 432a and the feature 452a may be measured. In some implementations, a subsequent change from the spatial relationship between the IR feature 432a and the feature 452a of the first enrollment would indicate a misalignment between the gaze tracking image sensor 312 and the content display 330. In some implementations, a subsequent change from the spatial relationship among the positions of the IR light pattern 432 of the first enrollment would indicate a misalignment between the gaze tracking image sensor 312 and the content display 330.

Figure 5:
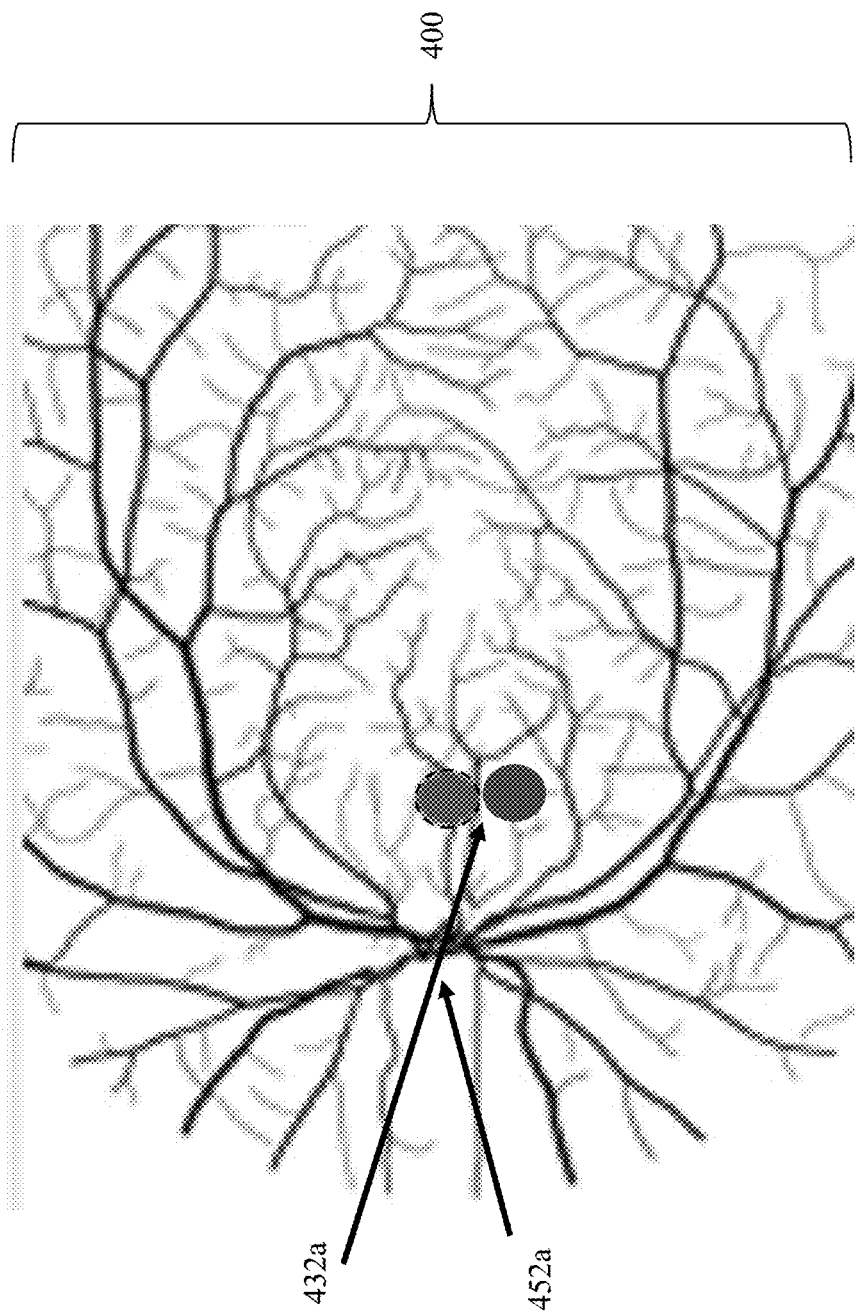
FIG. 5 is a diagram that illustrates another example image including a portion of a pattern of lights in combination with features of a retina in accordance with some implementations.

FIG. 5 is a diagram that illustrates an example image including a portion of a pattern of lights in combination with features of a retina. As shown in FIG. 5, a retinal image 500 includes the IR feature 432a and the feature 452a, but the IR feature 432a has moved relative to the feature 452a. In some implementations, based on the movement (e.g., number of pixels moved) of the IR feature 432a relative to the feature 452a, a specific amount of angular rotation of the display 330 relative to the gaze tracking image sensor 312 is determined, and the gaze tracking is adjusted accordingly to compensate and correct the misalignment.

As shown in FIG. 3, the pattern of lights is implemented with IR light. In some implementations, any color light may be used. For example, the display 330 may be a standard OLED display and projects the pattern of lights using one selected color such as red, and the gaze tracking image sensor 310 is changed to be able to detect the one selected color (e.g., in addition to IR light). Then, the pattern of lights in red would be overlaid with the retinal image and used to align or monitor the alignment of the display 330 and the gaze of the user of the electronic device 300. In one implementation, in an alignment procedure, the display 330 projects only the pattern of lights on a different colored background (e.g., white).

In some implementations, IR light from the IR pixels 332 form a pattern. For example, the pattern of the IR pixels may be constant and repeated throughout the display 330. Alternatively, the pattern of the IR pixels may be constant and occur once in a single portion (e.g., center) of the display 330. In some implementations, IR light from the IR pixels 332 form different patterns in different portions of the display 330. For example, each of 4 quadrants in the display 330 may have a different pattern of IR pixels 332. In some implementations, IR light from the IR pixels 332 may not form a pattern. In some implementations, IR light from the IR pixels 332 form patterns that have a single orientation detectable orientation.

As shown in FIG. 3, the IR pixels 332 are placed in the display 330. In some implementations, the IR pixels 332 may be IR light sources that are mounted on the display 330 or that pass light through the display 330. In some implementations, the light pattern is a repeated array of IR or visible light (e.g., red) instances. In some implementations, the IR pixels 332 may be IR light sources that have a fixed spatial relationship to the display 330. Thus, the light pattern from the IR pixels 332 may be within or adjacent to the displayed content at the display 330. In some implementations, the light pattern includes IR light or visible light. In one example, there is a single IR pixel 332. In some implementations, the IR light sources includes multiple addressable light sources such as vertical-cavity surface-emitting lasers (VCSEL) on Silicon, or light emitting diodes (LEDs).

In some implementations, IR light from an illumination source 314 for the gaze tracking image sensor 310 reflects off the beam splitter 320 and passes through the eye piece 340 to be focused on the retina 352. In some implementations, magnification from the content display to the eye 350 is on the order of ⅒. The image plane of the display 330 is at the retina of the eye 350. Further, the image plane of the gaze tracking system 310 is at the retina of the eye 350. Accordingly, images of the retina 352 and the portion of the light pattern 432 are aligned and focused. In contrast, gaze tracking techniques using glints are using different image planes and an alignment capability is very diminished.

FIG. 3 is an exemplary optical arrangement of the content display system and the gaze tracking system of the device 300. Other optical arrangements may be achieved using different or additional optical components including using mirrors, fiber optics, diffractive optical elements, waveguides, holographic elements, etc. In some implementations, the displayed content is displayed by a display or projected by a projector. In some implementations, the display or the projector is self-luminescent, emissive, transmissive, or reflective.

In some implementations, enrollment is used to generate a map of the retina 352 based on gaze direction (e.g., eye orientation). For example, while wearing an electronic device such as an HMD, a user is instructed to look in several different specific locations (e.g., left to right and top to bottom) and an image of the retina while looking at each specific location is generated. Then, in some implementations, the individual images (e.g., maps of portions of the retina) for each of the specific locations are combined into sectional maps of the retina 352 or a single, larger, combined map of the retina 352. During subsequent retinal imaging-based active gaze tracking, matching a current view of a portion of the retina 352 to the enrollment map of the retina (e.g., individual maps, sectional maps, or the combined retina map), identifies or determines a current gaze direction of the eye 350.

Figure 6:
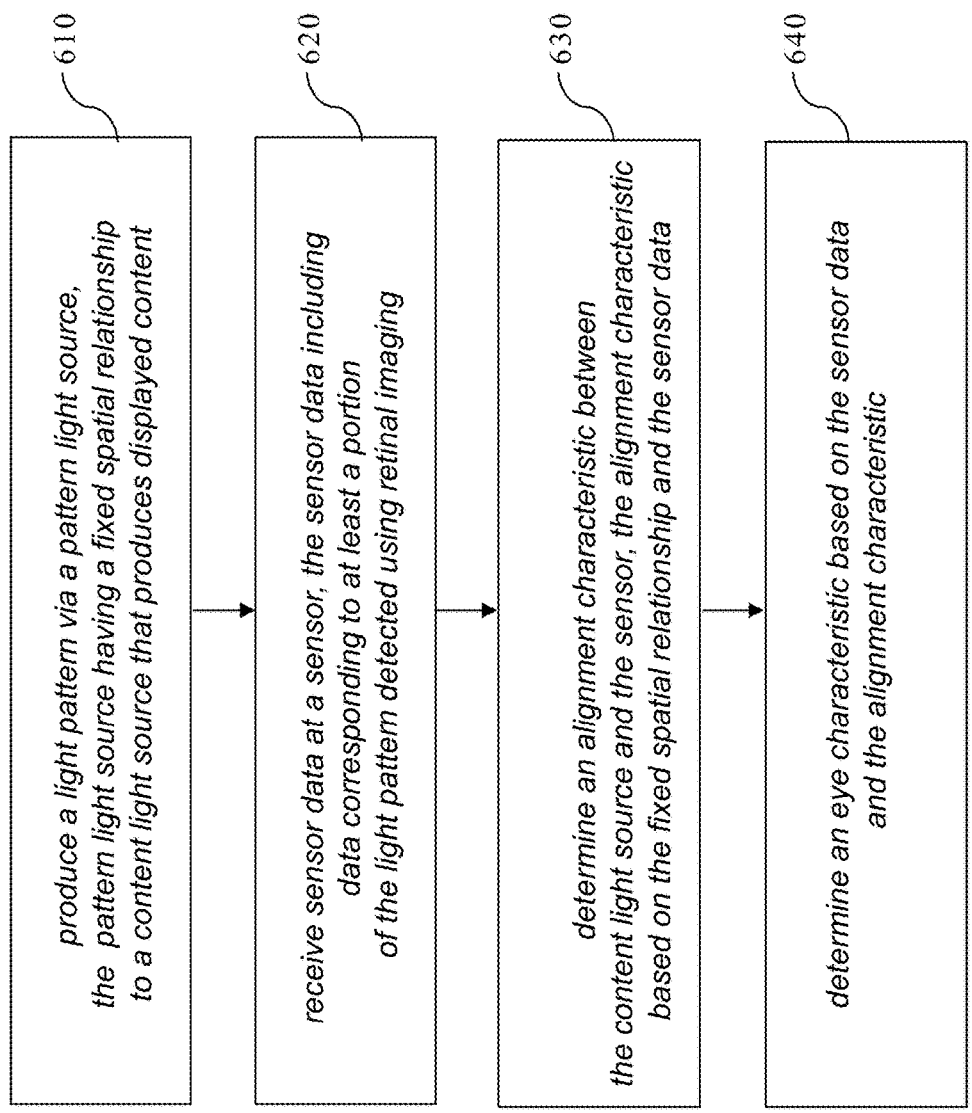
FIG. 6 is a flowchart illustrating an exemplary method of tracking a user's gaze based on a retinal imaging technique that corrects for misalignment between content display components and tracking components in accordance with some implementations.

FIG. 6 is a flowchart illustrating an exemplary method of tracking a user's gaze based on a retinal imaging technique that corrects for misalignment between content display components and tracking components in accordance with some implementations. In some implementations, misalignment is detected by providing a light pattern (e.g., IR light sources embedded in a display) within or adjacent to displayed content and assessing the image of the light pattern on the retina. In some implementations, the method 600 is performed by a device (e.g., electronic device 120, 200 of FIGS. 1-2). The method 600 can be performed using an electronic device or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory). In some implementations, the method 600 is performed by an electronic device having a processor.

At block 610, the method 600 produces a light pattern via a pattern light source, the pattern light source having a spatial relationship to a content light source that produces displayed content. In some implementations, the pattern light source is coupled to the content light source. In some implementations, the pattern light source is physically connected to the content light source. In some implementations, the light pattern includes IR light or visible light. In some implementations, the light pattern may be within or adjacent to the displayed content. In some implementations, the light pattern may be produced by light sources (a) embedded in, (b) mounted on, or (c) that pass light through a content display. In some implementations, the light pattern is a repeated array of IR or visible light (e.g., red) instances. In some implementations, the light pattern includes IR dots or visible light (e.g., red) dots. In some implementations, the content light source may be an LED display, an OLED display, a projector used to project AR content on a substrate like glass, etc. In some implementations, the 3D spatial relationship of the pattern light source and the content light source ensures that these components maintain a detectable alignment. In some implementations, the 3D spatial relationship includes a physical coupling of the pattern light source and the content light source. In some implementations, the content light source is a light emitting diode (LED) display and the light pattern is produced by point sources embedded within or mounted to the LED display. the content light source is the LED display and the light pattern is produced by point sources configured to pass light through the LED display. In some implementations, the light sources are LEDs or VCSELs. In some implementations, the content light source is a projector configured to project the displayed content onto a surface, and the pattern light source is a projector configured to project the light pattern onto the surface overlapping or adjacent to the displayed content.

At block 620, the method 600 receives sensor data (e.g., an image) at a sensor (e.g., IR camera), the sensor data including data corresponding to at least a portion of the light pattern detected using retinal imaging. In some implementations, the sensor data is image data corresponding to at least a portion of the light pattern reflected or scattered from the retina and captured by an image sensor. In some implementations, the sensor data is an image corresponding to at least a portion of the light pattern reflected from the retina among features of the retina that are captured by an IR camera. In some implementations, the sensor is part of a scanning apparatus or the sensor data is obtained using a scanning apparatus. For example, the received image may be formed using a point-by-point scanning apparatus or a line-by-line scanning apparatus. In some implementations, retinal imaging is performed using a scanning mirror and a single photodetector. For example, the scanning mirror and the single photodetector may be in a confocal arrangement.

At block 630, the method 600 determines an alignment characteristic between the content light source and the sensor, the alignment characteristic based on the spatial relationship and the sensor data. In some implementations, the alignment characteristic identifies a misalignment between the content light source and the sensor. In some implementations, the alignment characteristic is a detectable rotational change (e.g., a misalignment) between the content light source and the sensor. In some implementations, the alignment characteristic occurs over time.

At block 640, the method 600 determines an eye characteristic based on the sensor data and the alignment characteristic. In some implementations, the eye characteristic includes gaze direction based on the sensor data and the alignment characteristic. In some implementations, the eye characteristic includes eye orientation based on the sensor data. In some implementations, the eye characteristic is determined by comparing an image of the retina to a previously-generated map of the retina. In some implementations, the previously-generated map of the retina may be generated during an enrollment process. In some implementations, determining the eye characteristic may involve applying a correction based on the alignment characteristic (e.g., reducing or eliminating a detected misalignment).

In some implementations at block 630, the alignment characteristic is determined by identifying a misalignment based on detecting a relative movement in the portion of the light pattern reflected or scattered from the retina over time. In some implementations, the alignment characteristic is determined identifying a misalignment based on detecting a movement in the light pattern reflected or scattered from the retina relative to a portion of the retina over time.

In some implementations, the misalignment in the alignment characteristic is corrected by adjusting a position of the sensor relative to the pattern light source or the content light source. In some implementations, the misalignment in the alignment characteristic is reduced or eliminated by adjusting a position of the sensor relative to the pattern light source or the content light source.

In some implementations, IR light from the IR pixels 332 form a pattern. For example, the pattern of the IR pixels may be constant and repeated throughout the display 330. Alternatively, the pattern of the IR pixels may be constant and occur once in a single portion (e.g., center) of the display 330. In some implementations, the pattern is a single IR pixel 332.

In some implementations, the method 600 further includes retinal imaging-based gaze tracking using both eyes of user. In some implementations, the electronic device is a head-mounted device (HMD).

In some implementations, the retinal image data may be a still image, series of images, video, etc. In some implementations, the retinal image data further includes depth information such as a corresponding depth map.

In some implementations, the method 700 further includes retinal imaging-based gaze tracking using both eyes of user. In some implementations, the sensor data may be a still image, series of images, video, etc., which may include depth information such as a corresponding depth map.

Figure 7:
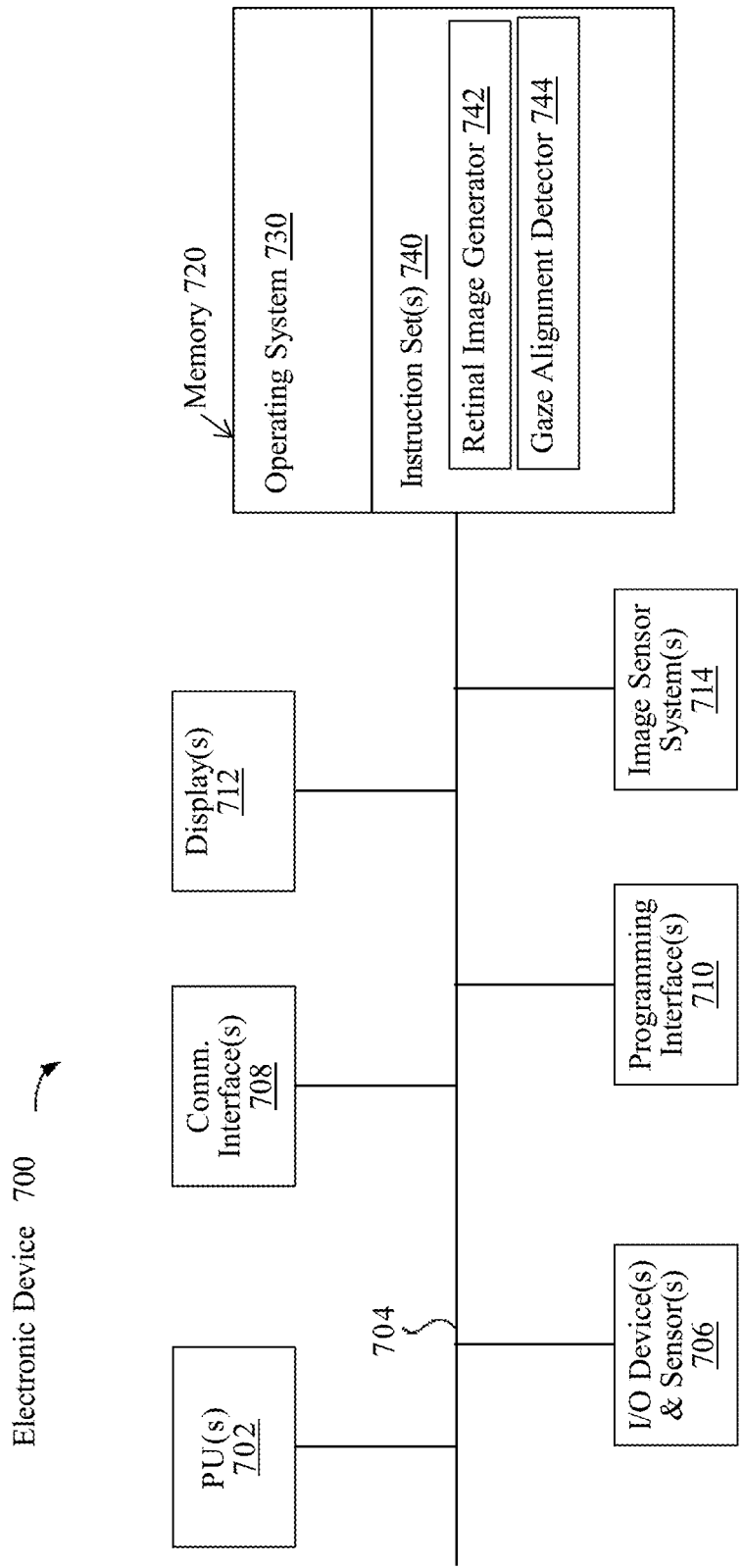
FIG. 7 illustrates an example electronic device in accordance with some implementations.

FIG. 7 is a block diagram of an example device 700. Device 700 illustrates an exemplary device configuration for the device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 700 includes one or more processing units 702 (e.g., microprocessors, ASICs, FPGAs, GPUs, CPUs, processing cores, or the like), one or more input/output (I/O) devices and sensors 706, one or more communication interfaces 708 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 710, one or more displays 712, one or more interior or exterior facing sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 712 are configured to present content to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 712 correspond to diffractive, reflective, polarized, holographic, etc. waveguide displays. For example, the electronic device 700 may include a single display. In another example, the electronic device 700 includes a display for each eye of the user.

In some implementations, the one or more interior or exterior facing sensor systems 714 include an image capture device or array that captures image data or an audio capture device or array (e.g., microphone) that captures audio data. The one or more image sensor systems 714 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 714 further include an illumination source that emits light such as a flash. In some implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

In some implementations, the instruction set(s) 740 include a retinal image generator 742 that is executable by the processing unit(s) 702 to capture sensor data representing a retina of a user of the device 700 according to one or more of the techniques disclosed herein.

In some implementations, the instruction set(s) 740 include a gaze alignment detector 744 that is executable by the processing unit(s) 702 to detect or determine a gaze direction misalignment to displayed content of the electronic device according to one or more of the techniques disclosed herein. In some implementations, the gaze alignment detector 744 is executed to compare a current retinal image with a map of the retina of the user of the electronic device.

Although the instruction set(s) 740 are shown as residing on a single device, it should be understood that in other implementations, any combination of the elements may be located in separate computing devices. FIG. 7 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

In some implementations, the electronic device 700 is a head mounted system including one or more speaker(s) and an integrated opaque display. Alternatively, the head mounted system may be configured to accept an external opaque display (e.g., a smartphone). Rather than an opaque display, the head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
        producing a light pattern via a pattern light source, the pattern light source having a fixed spatial relationship to a content light source that produces displayed content;
        receiving sensor data at a sensor, the sensor data comprising data corresponding to at least a portion of the light pattern detected using retinal imaging;
        determining an alignment characteristic between the content light source and the sensor, the alignment characteristic based on the spatial relationship and the sensor data, wherein said determining the alignment characteristic comprises identifying an angular alignment between the content light source and the sensor; and
        determining an eye characteristic based on the sensor data and the alignment characteristic.

2. The method of claim 1, wherein determining the alignment characteristic comprises identifying a misalignment based on detecting a relative movement in the portion of the light pattern detected from the retinal imaging over time.

3. The method of claim 2, further comprising reducing the misalignment by adjusting a position of the sensor relative to the pattern light source or the content light source.

4. The method of claim 1, wherein determining the alignment characteristic comprises identifying a misalignment based on detecting a movement in the light pattern reflected or scattered from a retina relative to a portion of the retina over time.

5. The method of claim 1, wherein the light pattern is within or adjacent to the displayed content.

6. The method of claim 1, wherein the content light source is a light emitting diode (LED) display and the light pattern is produced by point sources embedded within the LED display.

7. The method of claim 1, wherein the content light source is a light emitting diode (LED) display and the light pattern is produced by point sources mounted on the LED display.

8. The method of claim 1, wherein the content light source is a light emitting diode (LED) display and the light pattern is produced by point sources configured to pass light through the LED display.

9. The method of claim 1, wherein:
    the content light source is a projector configured to project the displayed content onto a surface; and
    the pattern light source is a projector configured to project the light pattern onto the surface overlapping or adjacent to the displayed content.

10. The method of claim 1, wherein the light pattern comprises infrared (IR) light.

11. The method of claim 1, wherein the light pattern comprises visible light.

12. The method of claim 1, wherein the eye characteristic is a gaze direction or eye orientation.

13. The method of claim 1, wherein the electronic device is a head-mounted device (HMD).

14. The method of claim 1, wherein the sensor data comprises an image, wherein the image is formed using a scanning apparatus or an image sensor.

15. The method of claim 1, wherein said determining the eye characteristic is further based on results of comparing the sensor data to previously-generated map of a retina.

16. The method of claim 1, wherein said determining the alignment characteristic further comprises identifying a rotational alignment between the content light source and the sensor.

17. A device comprising:
a content light source configured to produce displayed content;
a pattern light source configured to produce a light pattern, the pattern light source coupled to the content light source;
a sensor;
a processor coupled to the sensor; and
a computer-readable storage medium comprising instructions that upon execution by the processor cause the system to perform operations, the operations comprising:
   producing the light pattern via the pattern light source, the pattern light source having a fixed spatial relationship to the content light source;
   receiving sensor data at a sensor, the sensor data including data corresponding to at least a portion of the light pattern from a retina;
   determining an alignment characteristic between the content light source and the sensor, the alignment characteristic based on the spatial relationship and the sensor data, wherein said determining the alignment characteristic comprises identifying an angular alignment between the content light source and the sensor; and
   determining an eye characteristic based on the sensor data and the alignment characteristic.

18. The device of claim 17, wherein determining the alignment characteristic comprises identifying a misalignment based on detecting a relative movement in the light pattern reflected or scattered from the retina over time.

19. The device of claim 17, wherein determining the alignment characteristic comprises identifying a misalignment based on detecting a movement in the light pattern reflected or scattered from the retina relative to a portion of the retina over time.

20. A non-transitory computer-readable storage medium, storing program instructions computer-executable on a computer to perform operations comprising:
producing a light pattern via a pattern light source, the pattern light source having a fixed spatial relationship to a content light source that produces displayed content;
receiving sensor data at a sensor, the sensor data comprising data corresponding to at least a portion of the light pattern obtained using retinal imaging;
determining an alignment characteristic between the content light source and the sensor, the alignment characteristic based on the spatial relationship and the sensor data, wherein said determining the alignment characteristic comprises identifying an angular alignment between the content light source and the sensor; and
determining an eye characteristic based on the sensor data and the alignment characteristic.

* * * * *